(12) United States Patent
Sakurai

(10) Patent No.: US 10,409,265 B2
(45) Date of Patent: Sep. 10, 2019

(54) CONTROL DEVICE

(71) Applicant: Roland DG Corporation, Hamamatsu-shi, Shizuoka (JP)

(72) Inventor: Takayuki Sakurai, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 125 days.

(21) Appl. No.: 15/859,787

(22) Filed: Jan. 2, 2018

(65) Prior Publication Data

US 2018/0188711 A1 Jul. 5, 2018

(30) Foreign Application Priority Data

Jan. 5, 2017 (JP) ................. 2017-000750

(51) Int. Cl.
| | |
|---|---|
| G05B 15/02 | (2006.01) |
| G05B 19/40 | (2006.01) |
| B33Y 50/02 | (2015.01) |
| B33Y 30/00 | (2015.01) |
| G05B 19/4099 | (2006.01) |
| B29C 64/129 | (2017.01) |
| B29C 64/393 | (2017.01) |
| B32B 27/08 | (2006.01) |

(52) U.S. Cl.
CPC ........ *G05B 19/4099* (2013.01); *B29C 64/129* (2017.08); *B29C 64/393* (2017.08); *B33Y 30/00* (2014.12); *B33Y 50/02* (2014.12); *G05B 15/02* (2013.01); *G05B 2219/49007* (2013.01)

(58) Field of Classification Search
CPC ................. G05B 15/02; G05B 19/4099; G05B 2219/49007; B33Y 50/02; B33Y 30/00; B29C 64/393; B29C 64/129; B32B 27/08
USPC ............................................. 700/98
See application file for complete search history.

(56) References Cited

U.S. PATENT DOCUMENTS

| | | | |
|---|---|---|---|
| 2009/0133800 A1* | 5/2009 | Morohoshi | ........... B29C 64/106 156/58 |
| 2015/0019000 A1 | 1/2015 | Nakamura | |
| 2015/0287169 A1 | 10/2015 | Ueda et al. | |
| 2016/0121547 A1* | 5/2016 | Kobayashi | ............. B33Y 30/00 425/145 |

FOREIGN PATENT DOCUMENTS

| | | |
|---|---|---|
| JP | 2015-16610 A | 1/2015 |
| JP | 2015-201760 A | 11/2015 |

* cited by examiner

*Primary Examiner* — Michael J Brown
(74) *Attorney, Agent, or Firm* — Keating & Bennett, LLP

(57) ABSTRACT

A control device reads a slice image, positions a boundary line in an overlapped area in the slice image, extracts first and second image segments from the slice image, converts luminance values in the boundary line and an area in the first image segment to zero, converts luminance values in the boundary line and an area in the second image segment to zero, and outputs picture signals according to the image segments to projectors, respectively. The control device displaces the boundary line every time when it positions the boundary line in repeating such operations.

4 Claims, 12 Drawing Sheets

CONTROL DEVICE

CROSS REFERENCE TO RELATED APPLICATIONS

This application claims the benefit of priority to Japanese Patent Application No. 2017-000750 filed on Jan. 5, 2017. The entire contents of this application are hereby incorporated herein by reference.

BACKGROUND OF THE INVENTION

1. Field of the Invention

The present invention relates to control devices for controlling modeling machines.

2. Description of the Related Art

Modeling machines for creating three-dimensional objects by exposing a photocurable resin to light have been known. JP-A-2015-16610 and JP-A-2015-201760 describe modeling machines including two projectors positioned beneath a photocurable resin contained in a resin vat. The two projectors are supplied with different picture signals and pictures according to these picture signals are projected on the photocurable resin by the two projectors. Consequently, an exposed portion of the photocurable resin is cured and a modeled object is thus created.

If a projection area of one projector partially overlaps a projection area of the other projector, the colors of the pictures projected by these projectors are mixed in the overlapped area with an additive color mixing strategy. This could possibly cause excessive light exposure of the photocurable resin in the overlapped area, deteriorating the quality of the resultant modeled object.

SUMMARY OF THE INVENTION

Therefore, preferred embodiments of the present invention were made in consideration of the above circumstances, and prevent deterioration of qualities of modeled objects.

According to a preferred embodiment of the present invention, a control device for controlling a modeling machine that elevates, with an elevating mechanism, a holder in a photosensitive resin in a resin vat while projecting pictures on a bottom of the resin vat with first and second projectors, the bottom being transparent to light, the control device being configured or programmed to execute a process including: a reading step including reading a slice image; a positioning step including positioning a boundary line in a first direction perpendicular or substantially perpendicular to a second direction in an overlapped area where first and second areas in the slice image overlap with each other, the first and second areas being aligned and partially overlapped with each other in the second direction; an extracting step including extracting a first image segment in the first area from the slice image and a second image segment in the second area from the slice image; a luminance zeroization step including dropping luminance values in the boundary line in the first image segment to zero, dropping luminance values in an area at the side of the second area relative to the boundary line in the first image segment to zero, dropping luminance values in the boundary line in the second image segment to zero, and dropping luminance values in an area at the side of the first area relative to the boundary line in the second image segment to zero; and an output step including generating first and second picture signals according to the first and second image segments, respectively, that have been subjected to the luminance zeroization step and outputting the first and second picture signals to the first and second projectors, respectively; wherein the control device repeats the process with shifting, in the second direction, the boundary line every time that the control device executes the positioning step.

According to preferred embodiments of the present invention, modeled objects of high quality are able to be formed.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
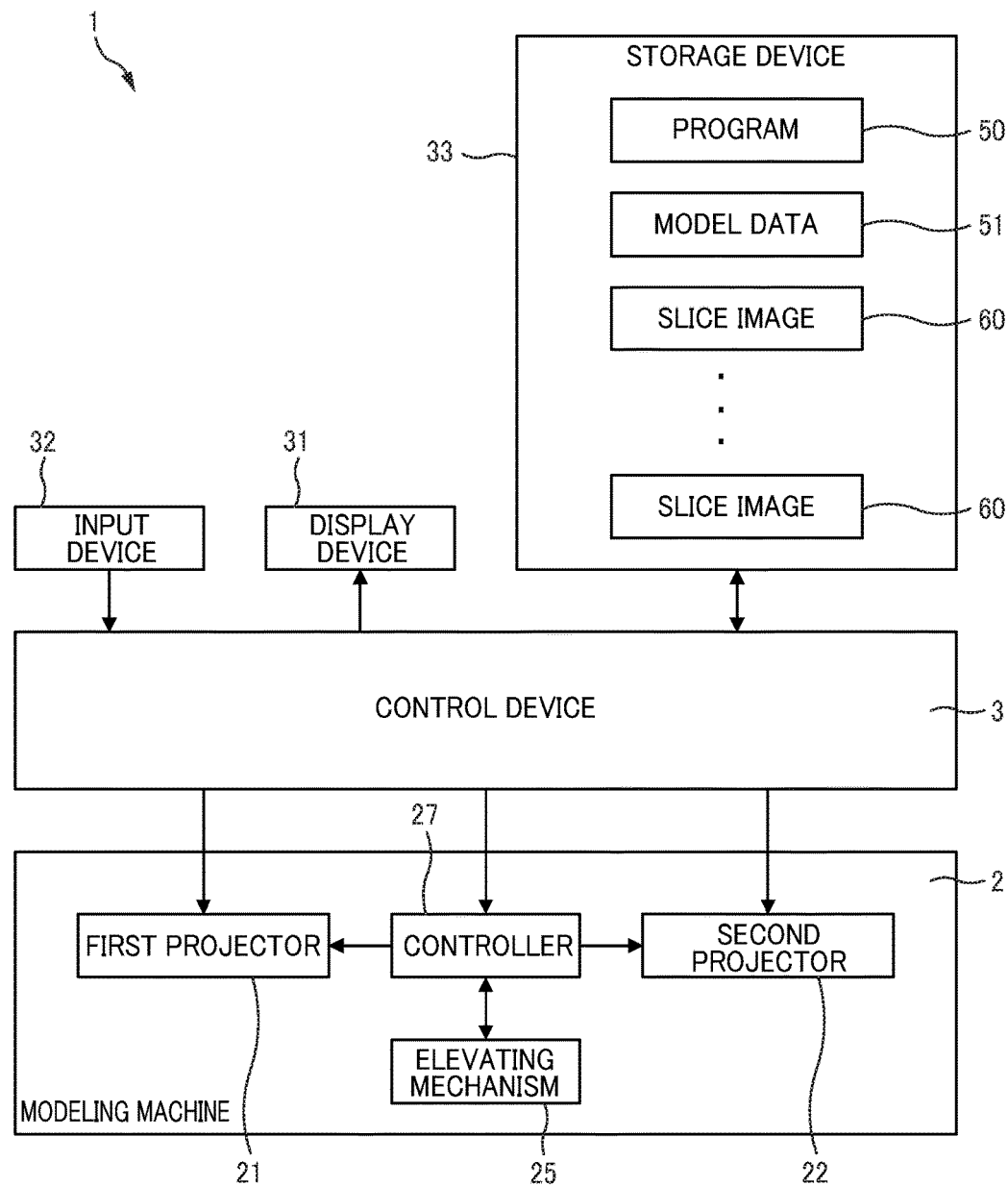
FIG. 1 is a block diagram of a modeling system.

Referring to the drawings, preferred embodiments of the present invention are described. These preferred embodiments described below are, however, provided with technically preferable various features to implement the present invention. Therefore, the scope of the present invention is not limited to the following preferred embodiments and illustrative examples.

FIG. 1 is a block diagram of a modeling system 1. As shown in FIG. 1, the modeling system 1 includes a modeling machine 2 and a control device 3.

The modeling machine 2 is for creating, by successively producing and building two-dimensional slice modeled objects, a three-dimensional modeled object which is a laminate of the slice modeled objects. Referring to a cross-sectional view shown in FIG. 2, the modeling machine 2 is described in detail. The X-, Y- and Z-axes shown in FIG. 2 are perpendicular or substantially perpendicular to each other.

Figure 2:
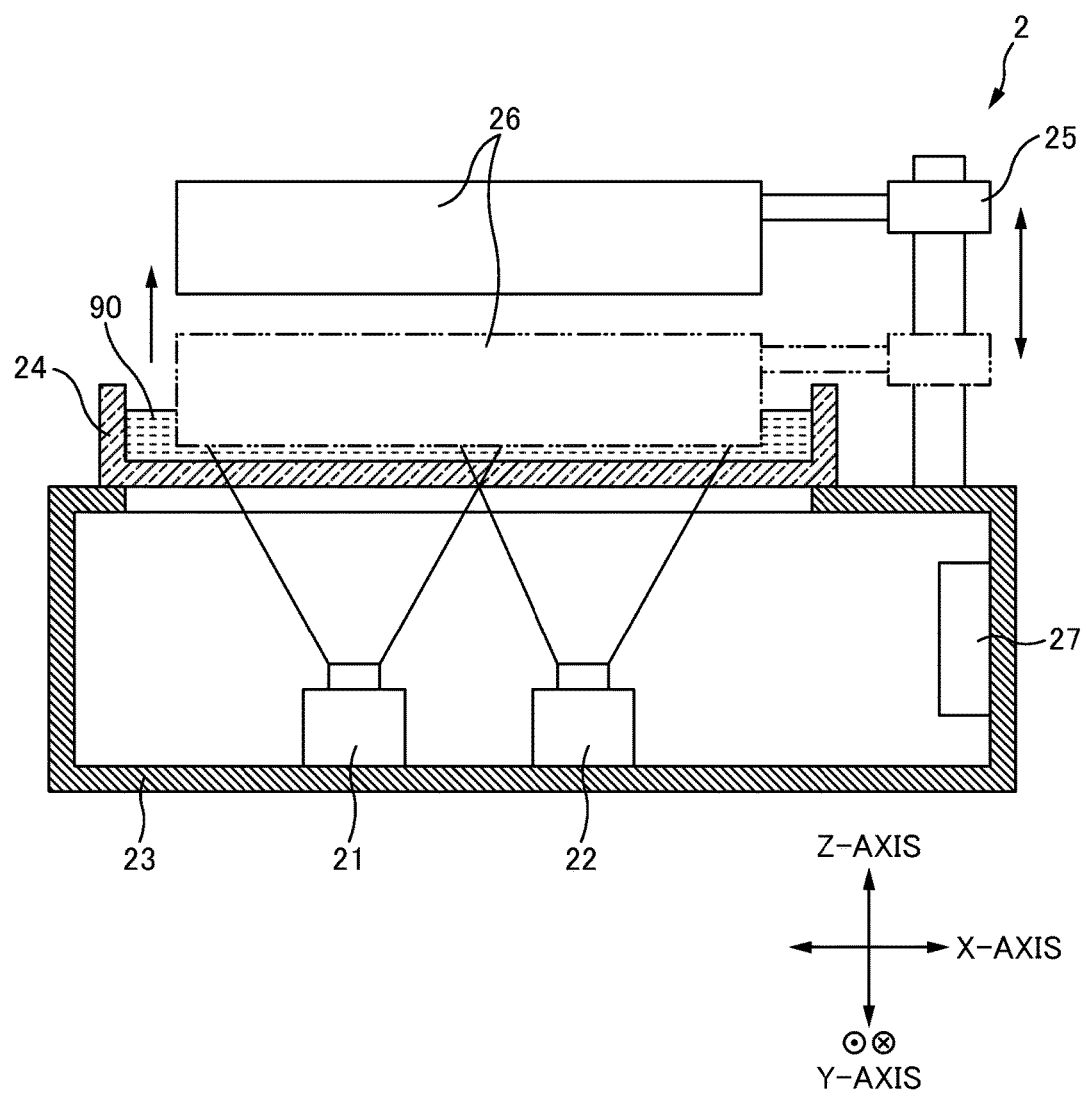
FIG. 2 is a vertical cross-sectional view of a modeling machine.

As shown in FIG. 2, the modeling machine 2 includes a first projector 21, a second projector 22, a housing 23, a resin vat 24, an elevating mechanism 25, a holder 26, a controller 27, and the others.

The housing 23 preferably has a hollow box shape. A top plate of the housing 23 is made of a material that is transparent to light (transparent material) or an opening is provided in the top plate of the housing 23.

The resin vat 24 is disposed on the top plate of the housing 23. An upper surface of the resin vat 24 is opened and at least a bottom plate of the resin vat 24 is made of a material that is transparent to light (transparent material). The resin vat 24 contains a photocurable resin 90 that is cured with light such as ultraviolet light.

The elevating mechanism 25 is disposed on the housing 23. The elevating mechanism 25 includes a motor, a linear transmission mechanism (such as a belt transmission mechanism, a chain transmission mechanism, a ball screw transmission mechanism or a rack-and-pinion mechanism), and other elements. The elevating mechanism 25 is provided with the holder 26, and the elevating mechanism 25 moves the holder 26 in the vertical direction (Z-direction). The holder 26 is held above the bottom of the resin vat 24. When the elevating mechanism 25 descends the holder 26, the holder 26 is immersed in the photocurable resin 90 in the resin vat 24.

In the housing 23, the first projector 21 and the second projector 22 are provided. The first projector 21 includes a light source (e.g., a laser diode or a light emitting diode) that emits light (e.g., ultraviolet radiation), a display (a digital micro-mirror device, a liquid crystal display) that displays a two-dimensional picture, an illumination optical system that directs the light emitted from the light source to the display, and a projection optical system that directs upward the light transmitted through or reflected from the display to project/focus the two-dimensional picture that is displayed on the display on the bottom of the resin vat 24. The term "optical system" refers to, for example, a single lens, a combination of lenses, or a combination of a reflecting mirror and a lens, for example.

The second projector 22 is structured in a similar manner to the first projector 21. The projectors 21 and 22 preferably are identical to each other in resolution (i.e., number of pixels that the projector is capable of displaying in one image), aspect ratio, luminous flux from the projector, throw ratio, optical characteristics, and the others.

The projectors 21 and 22 project, upward, pictures (such as monochrome pictures, binary pictures, and grayscale pictures) represented with distribution of darkness and brightness of the light. Specifically, the first projector 21 receives a first picture signal generated by the control device 3 (see, FIG. 1), and projects a picture according to the first picture signal on the bottom of the resin vat 24. The second projector 22 projects a picture according to a second picture signal generated by the control device 3 on the bottom of the resin vat 24. The projection plane (the focusing surface of the projection optical system) for the projectors 21, 22 is located at the bottom of the resin vat 24. The projection plane for the projectors 21, 22 is perpendicular or substantially perpendicular to the vertical direction (Z-direction).

Figure 3:
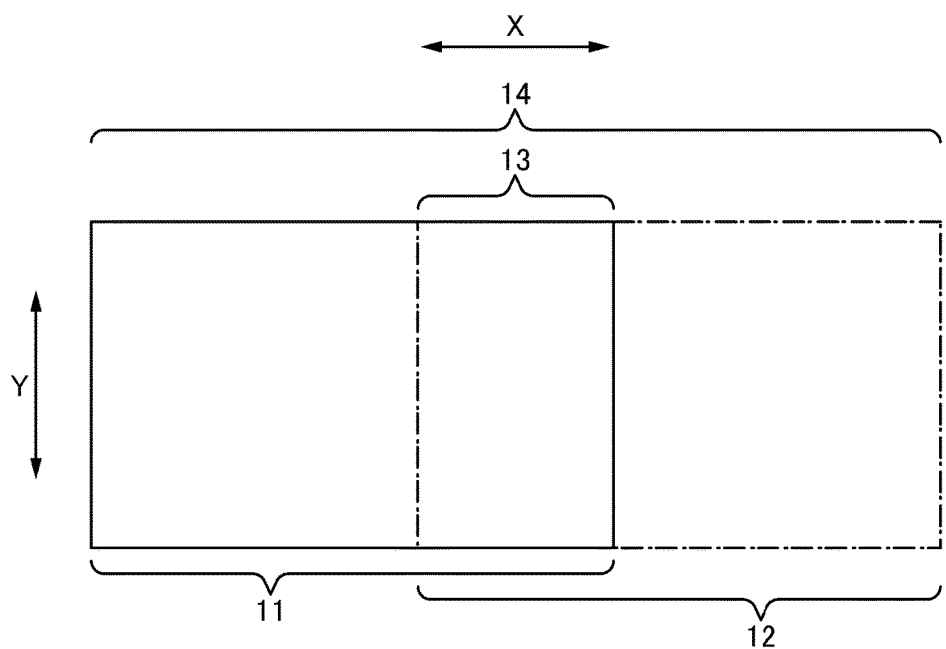
FIG. 3 is a diagram illustrating areas in which pictures are projected by first and second projectors.

An example of rectangular or substantially rectangular areas (hereinafter, referred to as projection areas) in which pictures are projected by the projectors 21 and 22 on the projection plane is shown in FIG. 3. As shown in FIG. 3, a first projection area 11 of the first projector 21 and a second projection area 12 of the second projector 22 are aligned and partially overlapped with each other, with their two edges aligned with each other in the X-direction. It should be noted that the positions where the projectors 21 and 22 are installed are determined beforehand so that the first and second projection areas 11 and 12 are partially overlapped with each other as shown in FIG. 3, and picture signals supplied to the projectors 21 and 22 are calibrated (e.g., projective transformation such as keystoning) beforehand.

An area where the first projection area 11 and the second projection area 12 are overlapped with each other is referred to as an overlapped projection area 13. The entire area for the combination of the first projection area 11 and the second projection area 12 is referred to as a composite area 14. The number of pixels in the composite area 14 is equal to a value obtained by subtracting the number of pixels in the overlapped projection area 13 from a sum of the number of pixels in the first and second projection areas 11 and 12.

As shown in FIG. 2, the controller 27 is provided in the housing 23. The controller 27 is a control circuit including, for example, various driving circuits (e.g., a motor driver and a light source driver) and a microcomputer (e.g., a programmable logic controller). The controller 27 controls, according to commands from the control device 3, the elevating mechanism 25 and the projectors 21 and 22 (mainly the light sources). With this, the modeling machine 2 performs modeling operations. A modeling operation performed by the modeling machine 2 is as follows.

First, when the elevating mechanism 25 descends the holder 26, the holder 26 is immersed in the resin 90 in the resin vat 24. Then, the light sources of the projectors 21 and 22 are intermittently lit and the elevating mechanism 25 moves the holder 26 intermittently for a certain distance. The timing at which the light sources of the projectors 21 and 22 are turned off synchronizes the timing at which the elevating mechanism 25 operates (the timing at which the holder 26 rises), and the timing at which the light sources of the projectors 21 and 22 are turned on synchronizes the timing at which the elevating mechanism 25 stops (the timing at which the upward movement of the holder 26 is discontinued). Thus, whenever the elevating mechanism 25 stops, each of the projectors 21 and 22 projects a picture according to a picture signal on the bottom of the resin vat 24 for a predetermined exposure time. Consequently, whenever the elevating mechanism 25 stops, a portion (exposed portion) of the resin 90 corresponding to a bright region in the picture is cured with light (e.g., ultraviolet light) at the bottom of the resin vat 24, and a two-dimensional slice modeled object (cured resin) having the same shape as that of the bright region in the picture is formed at the bottom of the resin vat 24. Every time when the elevating mechanism 25 is activated, the slice modeled object(s) is/are moved up together with the holder 26. In this way, by alternating the projection/exposure using the projectors 21 and 22 and the upward movement of the holder 6, a three-dimensional modeled object grows downward beneath the holder 26.

As shown in FIG. 1, the control device 3 is connected to the controller 27 and the first and second projectors 21 and 22 of the modeling machine 2. The control device 3 preferably includes a computer having a CPU, a RAM, a ROM, a GPU, a system bus, a hardware interface, and the other elements, for example.

The control device 3 is connected to a display device (e.g., a liquid crystal display) 31, an input device (e.g., a keyboard, a pointing device, and a push switch) 32, and a storage device (e.g., a semiconductor memory or a hard disk drive) 33. The storage device 33 may be built in the control device 3.

Figure 4:
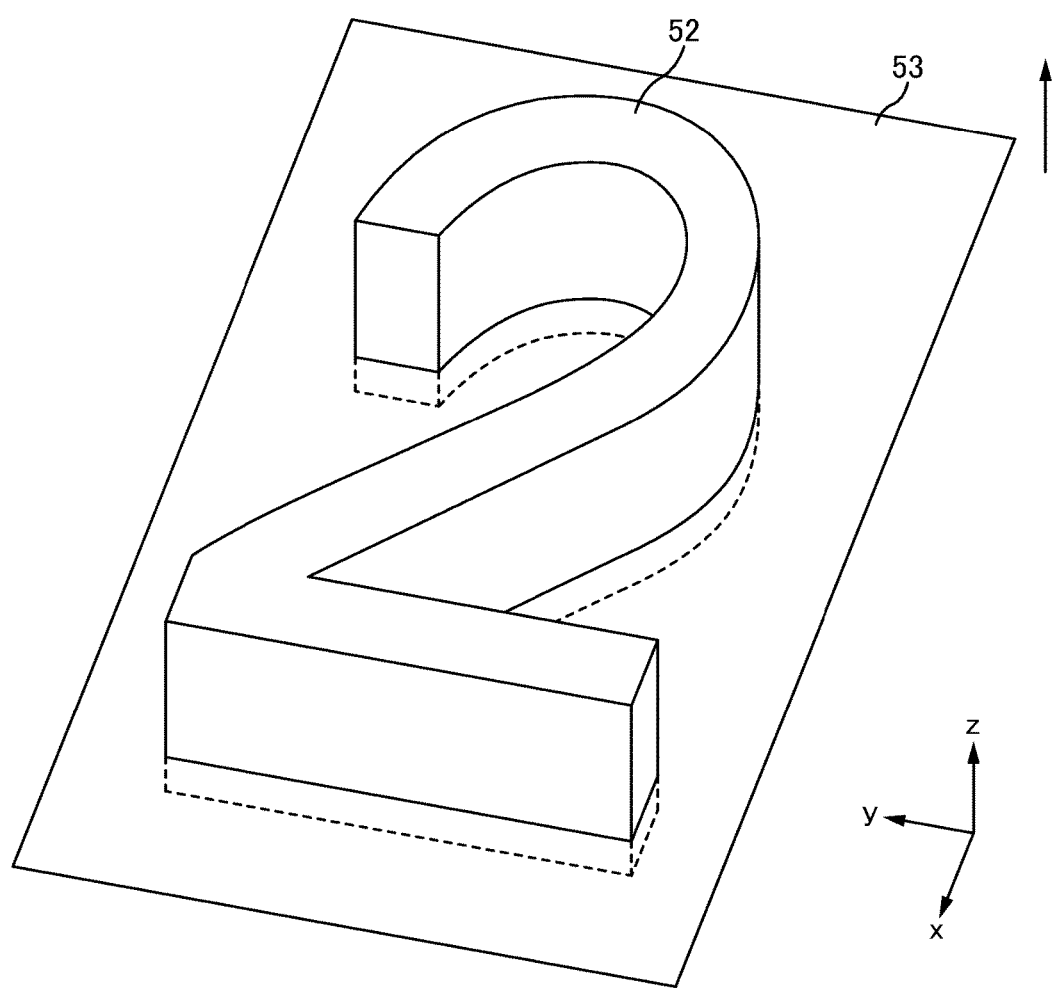
FIG. 4 is a diagram illustrating a model for a modeled object.

In the storage device 33, model data (three-dimensional data) 51 are stored each of which is obtained by modeling a three-dimensional modeled object in a virtual three-dimensional space. The model data 51 is, for example, CAD data generated using a three-dimensional computer-aided design (CAD). FIG. 4 shows a model 52 that has been modeled in a virtual three-dimensional space according to the model data 51. As shown in FIG. 4, the positions of points in the 3D space which are represented by the model data 51 are represented by a three-dimensional Cartesian coordinate system (x-, y, and z-coordinates). The z-direction in the Cartesian coordinate system is aligned with the direction in which the holder 26 is moved by the elevating mechanism 25 (Z-direction). The x-direction in the Cartesian coordinate system is aligned with the X-direction in FIGS. 2 and 3. The y-direction in the Cartesian coordinate system is aligned with the Y-direction in FIGS. 2 and 3. The 3D shape of the model 52 is an example and is not limited to the one shown in FIG. 4.

As shown in FIG. 1, a program 50 that can be executed by the control device 3 is stored in the storage device 33. The program 50 causes the control device 3 to execute an operation of generating a plurality of slice images 60 from the model data 51.

Specifically, as shown in FIG. 4, the control device 3 generates, from the model data 51, two-dimensional shape data (an image in a vector format) for a cross section of the model data 51 along a plane 53 that is perpendicular or substantially perpendicular to the z-axis, and converts the two-dimensional shape data into a slice image 60 in a raster format. The slice image 60 thus generated is an image for a single layer. The control device 3 successively performs the aforementioned vector/raster conversion for the two-dimensional shape data while successively shifting the plane 53 in the z-direction. Consequently, a plurality of slice images 60 are successively generated by the control device 3. The control device 3 then stores the slice images 60 on the storage device 33 in the order of being generated, and also stores, on the storage device 33, data on the order representing the order of generation, with the data on the order being correlated to the respective slice images 60. Since the plane 53 is successively shifted in the z-direction as described above, the data on the order correlated to the slice image 60 represents a z-coordinate value, in an ascending order or descending order, of the plane 53 that is used to generate the slice image 60.

It should be noted that the difference between the z-coordinate value of the plane 53 at a time when a slice image 60 is generated and the z-coordinate value of the plane 53 at another time when the next slice image 60 is generated is equal to a distance by which the holder 26 is elevated each time by the elevating mechanism 25.

Figure 5:
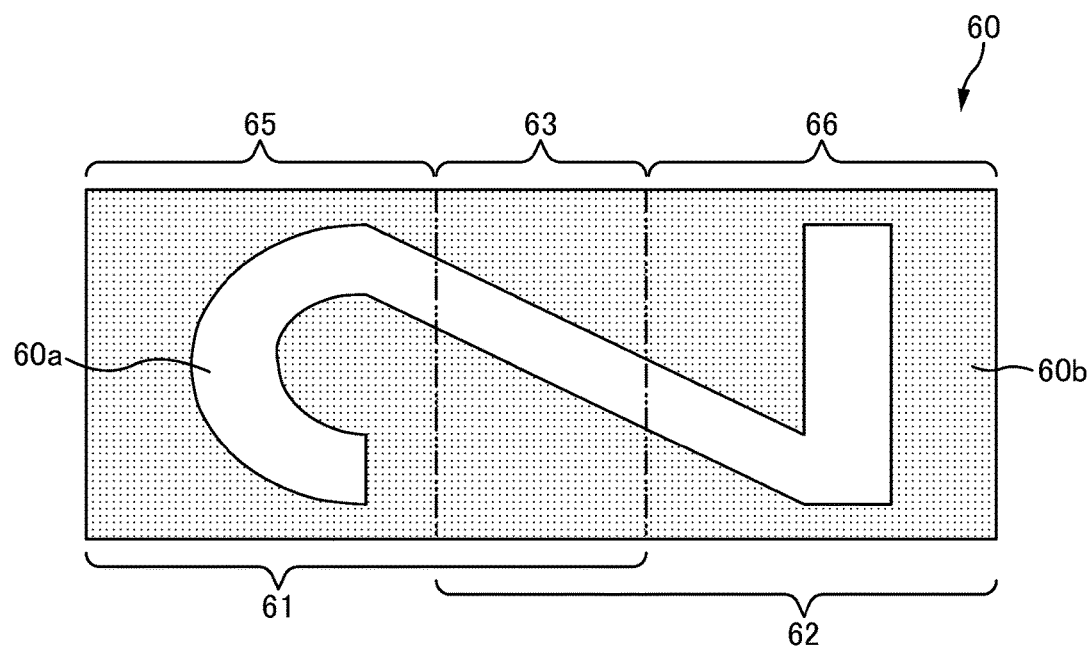
FIG. 5 is a diagram illustrating a slice image generated from a model.

FIG. 5 shows an example of a generated slice image 60. In the slice image 60, an object area 60*a* corresponds to a cross section of the model 52, and the object area 60*a* has a high luminance value or values. In the slice image 60, a background area 60*b* other than the object area 60*a* corresponds to a space surrounding the model 52. The background area 60*b* has the luminance value of 0 (zero).

The program 50 causes the control device 3 to execute a process of generating first and second picture signals from the slice images 60 in the order the slice images 60 have been generated. The timing at which the first and second picture signals are generated synchronizes the timing at which the projectors 21 and 22 are turned on and the elevating mechanism 25 stops. Accordingly, when the upward movement of the holder 26 is not made, the first and second picture signals generated from the slice image 60 are supplied to the first and second projectors 21 and 22, respectively. Since the picture according to the first picture signal is projected on the first projection area 11 by the first projector 21 and the picture according to the second picture signal is projected on the second projection area 12 by the second projector 22, the slice image 60 is drawn in the composite area 14. The number of pixels in the slice image 60 is equal to the number of pixels in the composite area 14, and the outer periphery of the slice image 60 corresponds to the outer periphery of the composite area 14.

As shown in FIG. 5, in the slice image 60, a rectangular first area 61 corresponds to the first projection area 11 and a rectangular second area 62 corresponds to the second projection area 12. The first and second areas 61 and 62 are aligned and partially overlapped with each other in an overlapped area 63, with their two edges aligned with each other in the X-direction. An area 65 in the first area 61 outside the overlapped area 63 is referred to as a first exclusive area 65 and an area 66 in the second area 62 outside the overlapped area 63 is referred to as a second exclusive area 66.

The ranges of the first area 61, the second area 62, the overlapped area 63, the first exclusive area 65, and the second exclusive area 66 in the slice image 60 is incorporated beforehand into the program 50 using coordinates (see, FIG. 5). The control device 3 thus recognizes the first area 61, the second area 62, the overlapped area 63, the first exclusive area 65, and the second exclusive area 66 with the program 50.

Figure 6:
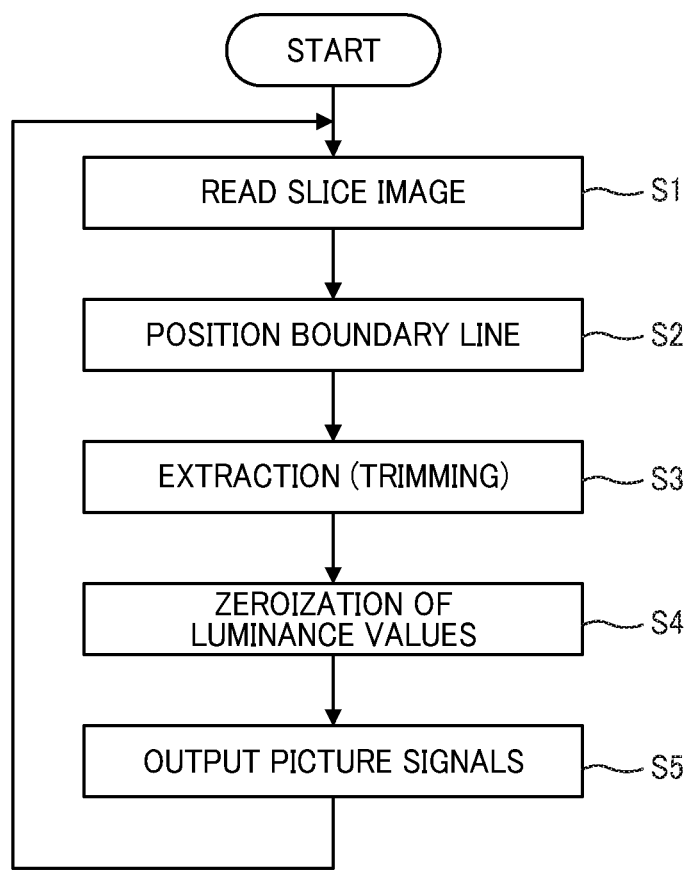
FIG. 6 is a flowchart showing a process flow in a control device.

A process of generating the first and second picture signals from the slice images 60 is as shown in a flowchart in FIG. 6.

First, the control device 3 reads a slice image 60 from the storage device 33 (step S1) and copies the slice image 60.

Figure 7A:
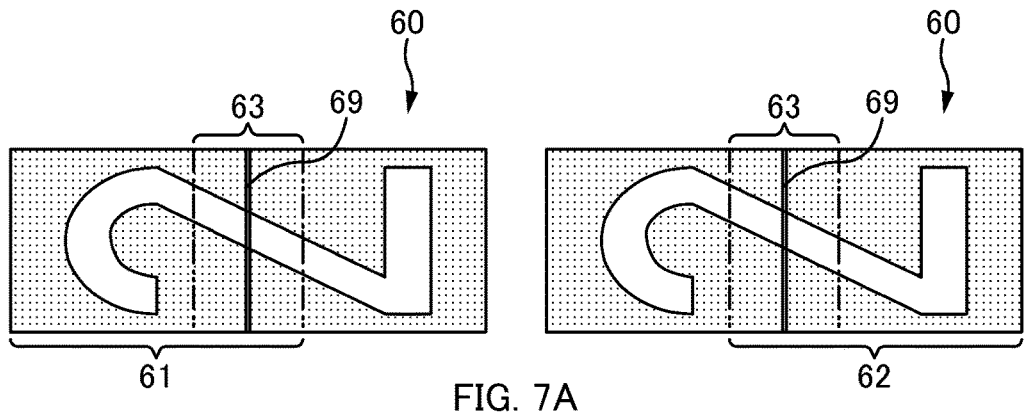
FIG. 7A is a diagram illustrating a process of generating picture signals from a slice image.

Next, the control device 3 positions a boundary line 69 aligned with the Y-direction in the overlapped area 63 in the slice image 60, as shown in FIG. 7A (step S2). The width of the boundary line 69 in the X-direction is shorter than the width of the overlapped area 63 in the X-direction and has a dimension of one pixel or a few pixels (e.g., 1-5 pixels). A position of the boundary line 69 is described in more detail later.

Figure 7B:
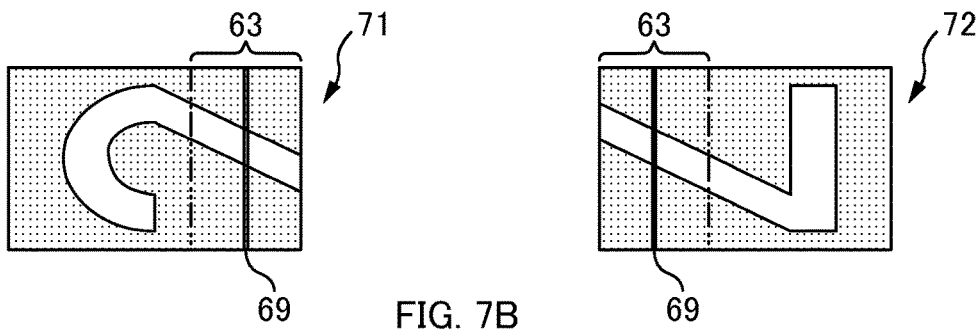
FIG. 7B is a diagram illustrating a process of generating picture signals from a slice image.

Next, the control device 3 extracts (trims) the first area 61 in one slice image 60 as shown in FIG. 7B to generate a first image segment 71 (step S3).

Likewise, the control device 3 extracts (trims) the second area 62 in the other slice image 60 to generate a second image segment 72.

Figure 7C:
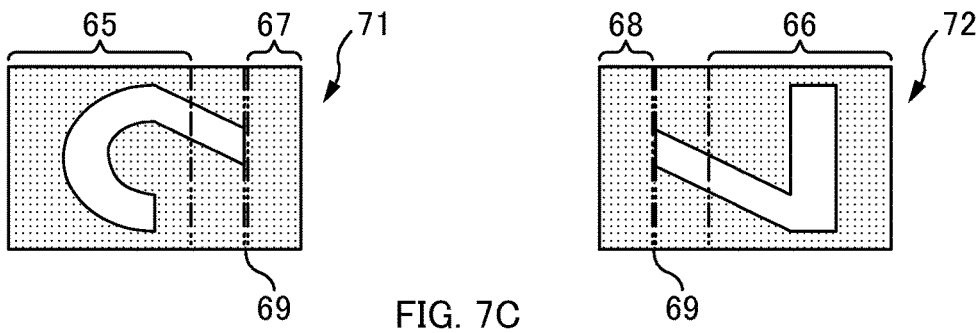
FIG. 7C is a diagram illustrating a process of generating picture signals from a slice image.

Next, the control device 3 converts luminance values in the boundary line 69 in the first image segment 71 (the first area 61) into 0 (zero) which is the same as that of the background area 60*b*, as shown in FIG. 7C (step S4). Furthermore, the control device 3 converts luminance values in an area 67 opposite to the first exclusive area 65 (the area 67 at the side of the second exclusive area 66) relative to the boundary line 69 in the first image segment 71 (the first area 61) into 0 (zero) which is the same as that of the background area 60*b*.

Likewise, the control device 3 converts the luminance values in the boundary line 69 in the second image segment 72 (the second area 62) into 0 (zero) which is the same as that of the background area 60*b*. Furthermore, the control device 3 converts luminance values in an area 68 opposite to the second exclusive area 66 (the area 68 at the side of the first exclusive area 65) relative to the boundary line 69 in the second image segment 72 (the second area 62) into 0 (zero) which is the same as that of the background area 60b.

Next, the control device 3 generates a first picture signal according to the first image segment 71 and supplies the first picture signal to the first projector 21 (step S5). In synchronism with this, the control device 3 generates a second picture signal according to the second image segment 72 and supplies the second picture signal to the second projector 22.

Figure 8:
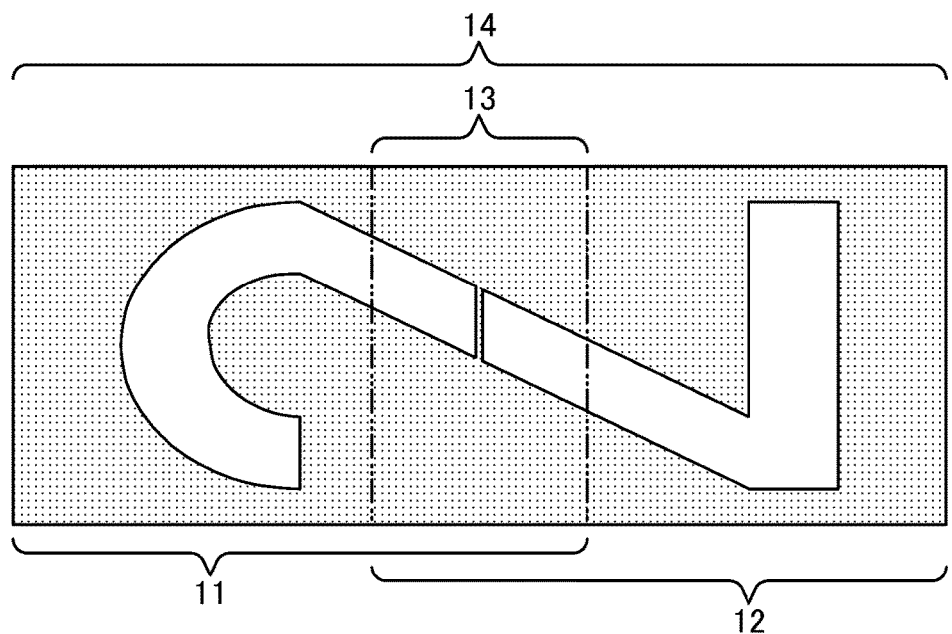
FIG. 8 is a diagram illustrating pictures projected by first and second projectors and then composed with each other.

Then, as shown in FIG. 8, the first image segment 71 is projected as a picture on the first projection area 11 and the second image segment 72 is projected as a picture on the second projection area 12, with which a slice modeled object is formed. In the overlapped projection area 13, colors of the first image segment 71 and the second image segment 72 are mixed with an additive color mixing strategy. However, as shown in FIG. 8, the luminance values in the area 67 in the first image segment 71 are converted to 0 and the luminance values in the area 68 in the second image segment 72 are converted to 0. Thus, the resin 90 in the overlapped projection area 13 is not excessively exposed to light. As a result, for example, the portion corresponding to the overlapped projection area 13 is not excessively cured and the slice modeled object of high quality is formed.

Furthermore, since the luminance values of the boundary line 69 that are shared by the first and second image segments 71 and 72 are also converted to 0, a dark line along the Y-direction appears at the center of the composite area 14 as shown in FIG. 8 and the slice modeled object has a gap (at the position corresponding to the dark line). By the way, the first and second projection areas 11 and 12 could possibly be deviated from their ideal designed positions due to errors in, for example, assembling the projectors 21 and 22. Even in such cases, it is possible to reduce an overlap between a bright region in the first projection area 11 and the bright region in the second projection area 12 by converting the luminance values in the boundary line 69 to 0. Therefore, excessive exposure of the resin 90 in the overlapped projection area 13 is able to be reduced, and the sliced modeled object of high quality is able to be formed.

One cycle of the process includes a series of operations as described above and the control device 3 repeats the cycles. During these cycles, the control device 3 reads, at step S1, the slice images 60 according to the order in which they have been generated.

The order of the extraction step at step S3 and the luminance zeroization step at step S4 is able to be reversed. Specifically, operations are as follows.

First, the control device 3 reads a slice image 60 from the storage device 33 and copies the slice image 60.

Figure 9A:
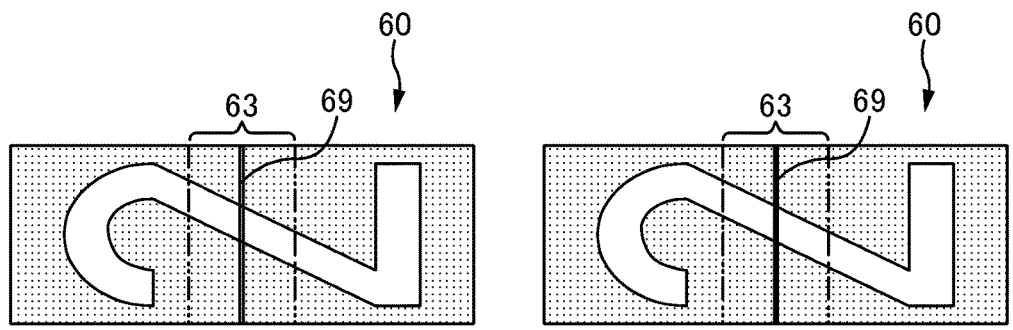
FIG. 9A is a diagram illustrating a process of generating picture signals from a slice image.

Next, the control device 3 positions a boundary line 69 aligned with the Y-direction in the overlapped area 63 in the slice image 60, as shown in FIG. 9A. The position of the boundary line 69 is described in more detail later.

Figure 9B:
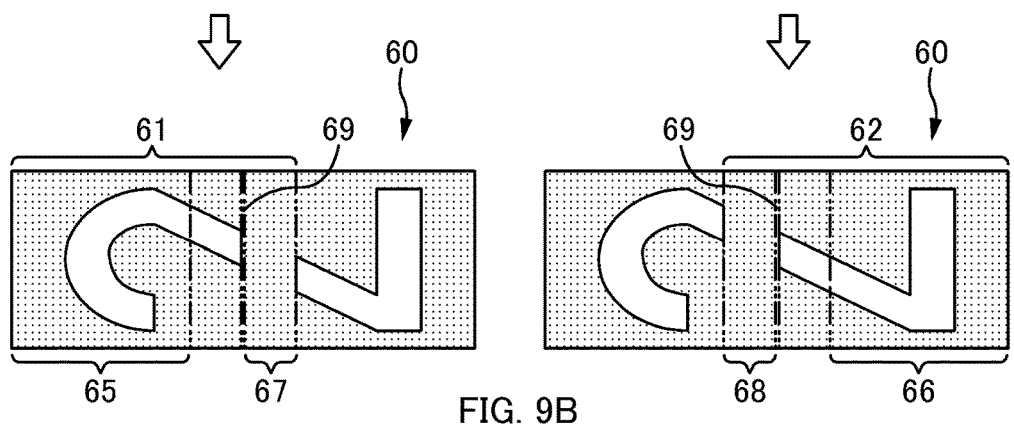
FIG. 9B is a diagram illustrating a process of generating picture signals from a slice image.
Figure 9C:
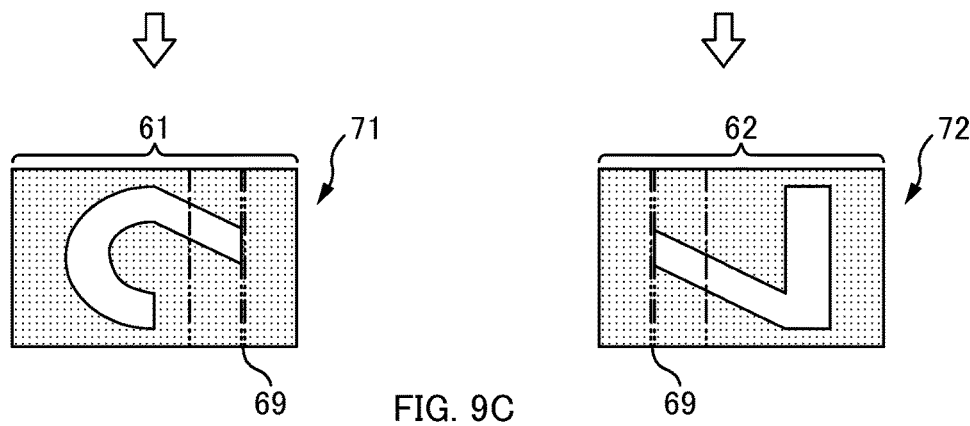
FIG. 9C is a diagram illustrating a process of generating picture signals from a slice image.

Next, the control device 3 converts luminance values in the boundary line 69 in one slice image 60 into 0 (zero) which is the same as that of the background area 60b, as shown in FIG. 9B. Furthermore, the control device 3 converts luminance values in an area 67 opposite to the first exclusive area 65 (the area 67 at the side of the second exclusive area 66) relative to the boundary line 69 in the slice image 60 into 0 (zero) which is the same as that of the background area 60b.

Likewise, the control device 3 converts the luminance values in the boundary line 69 in the other slice image 60 into 0 (zero) which is the same as that of the background area 60b. Furthermore, the control device 3 converts luminance values in an area 68 opposite to the second exclusive area 66 (the area 68 at the side of the first exclusive area 65) relative to the boundary line 69 in the other slice image 60 into 0 (zero) which is the same as that of the background area 60b.

Next, the control device 3 extracts (trims) the first area 61 in one slice image 60 as shown in FIG. 9B to generate a first image segment 71.

Likewise, the control device 3 trims the second area 62 in the other slice image 60 to generate a second image segment 72.

Next, the control device 3 generates a first picture signal according to the first image segment 71 and supplies the first picture signal to the first projector 21. In synchronism with this, the control device 3 generates a second picture signal according to the second image segment 72 and supplies the second picture signal to the second projector 22.

As described above, the control device 3 reads the slice images 60 in the order of being generated and positions the boundary line 69 every time the slice image 60 is read (see, step S2). The position of the boundary line 69 is not fixed for all of the operations in step S2. Instead, the boundary line 69 is displaced (shifted) in the X-direction in each operation in step S2.

Figure 10:
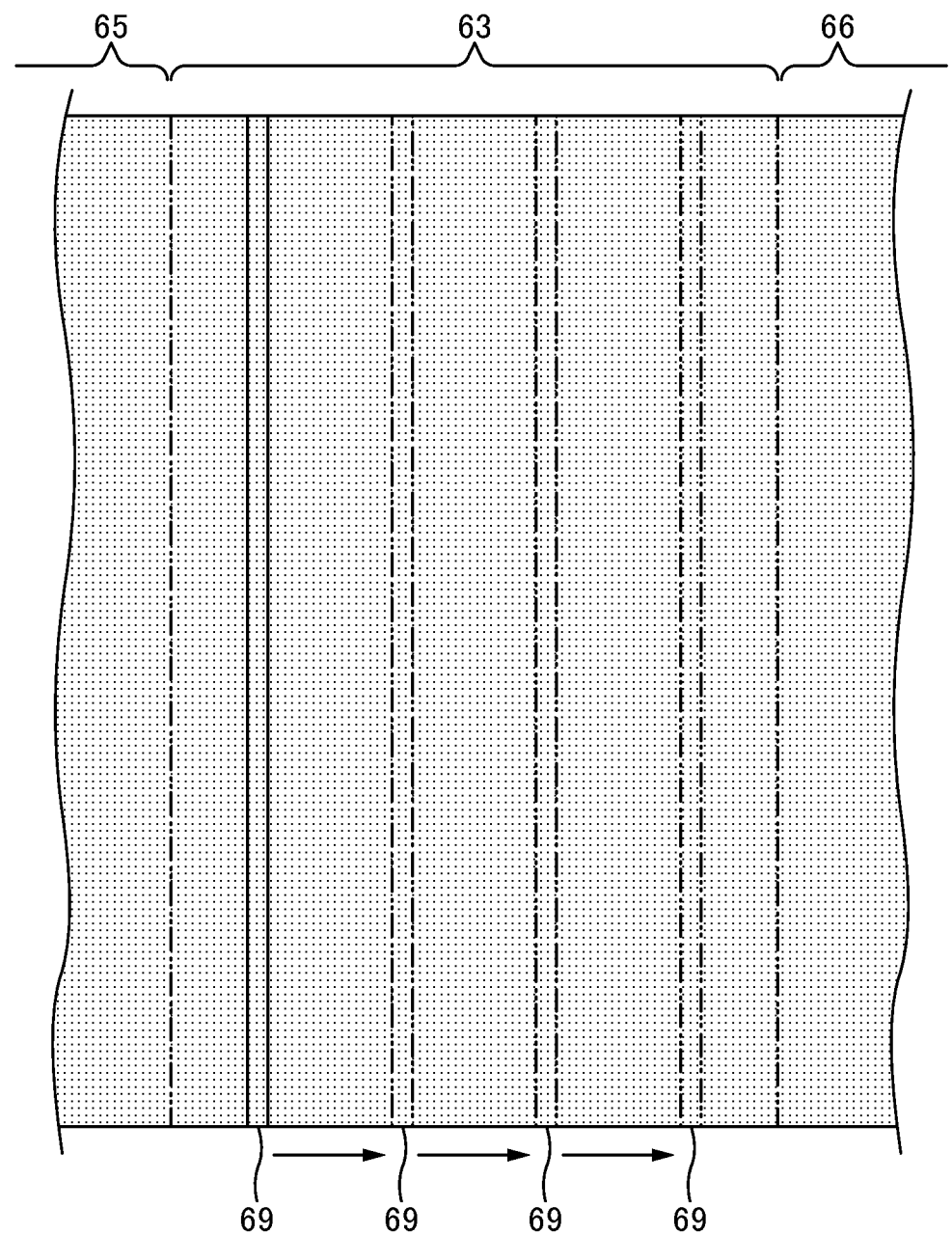
FIG. 10 is a diagram illustrating displacement of a boundary line.

For example, as shown in FIG. 10, the control device 3 positions the boundary line 69 in such a manner that the boundary line 69 is displaced from a position closer to the first exclusive area 65 to a position closer to the second exclusive area 66 (or vice versa) every time when step S2 is executed. The amount of displacement is shorter than the width of the overlapped area 63 in the X-direction and has a dimension of one pixel or a few pixels (e.g., 1-5 pixels). The amount of displacement may be equal to the width of the boundary line 69 in the X-direction. The amount may be shorter than or longer than the width of the boundary line 69 in the X-direction.

The amount of displacement may be constant or may be different from cycle to cycle in step S2. The boundary line 69 may be displaced only in one direction or the direction of displacement may be reversed every few times.

As described above, by displacing the boundary line 69 in the X-direction in each operation of step S2, it is possible to prevent the gaps from being aligned vertically in the slice modeled objects stacked on top of each other. Accordingly, modeled objects of high quality are able to be formed.

While the boundary line 69 in the aforementioned preferred embodiment preferably is a straight line, it may be a curved line. The boundary line 69 may be perpendicular or substantially perpendicular to the horizontal line in the X-direction or may intersect the horizontal line in the X-direction at an angle.

Figure 11:
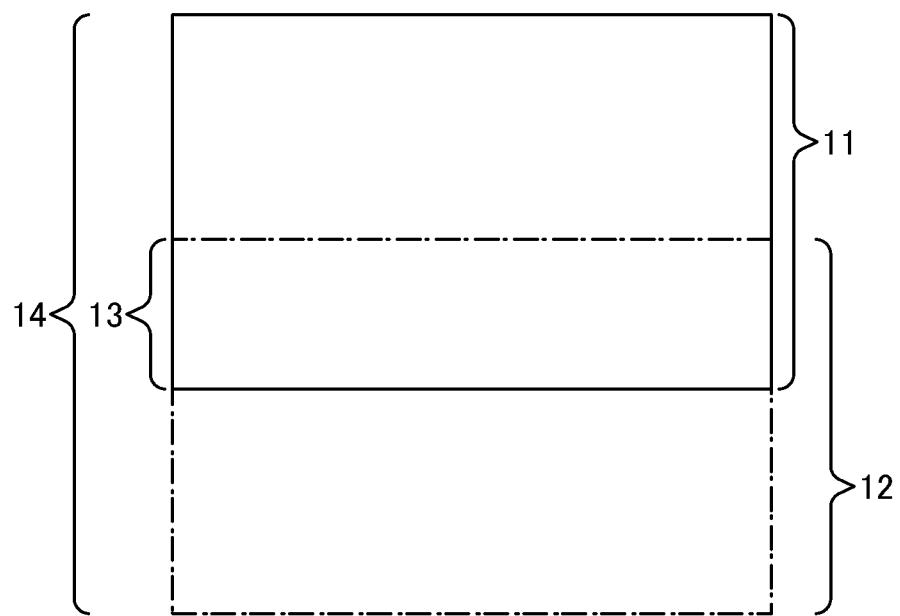
FIG. 11 is a diagram illustrating areas in which pictures are projected by first and second projectors.
Figure 12:
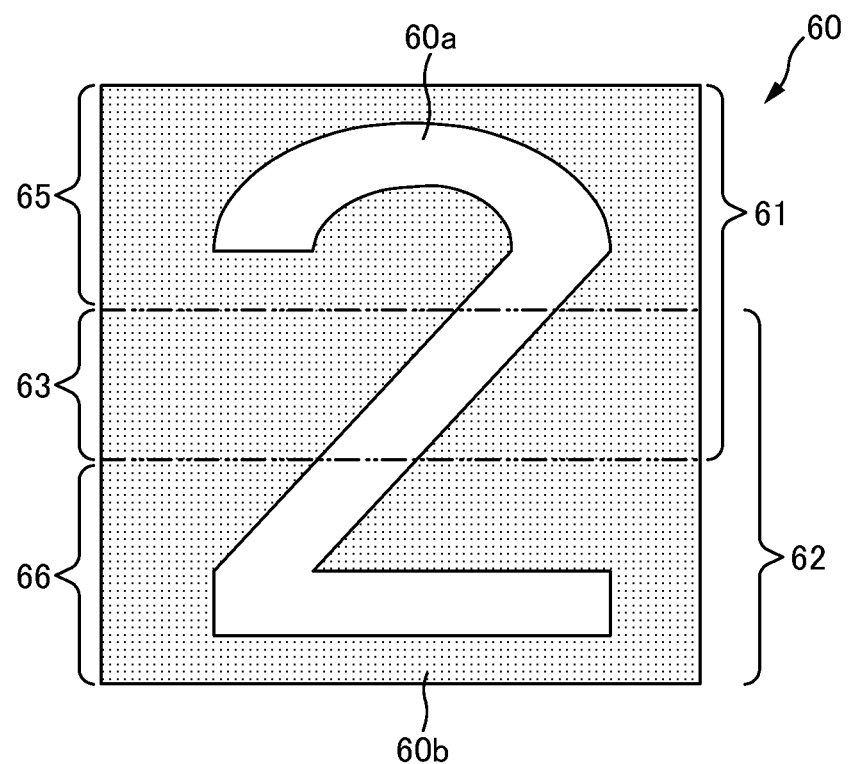
FIG. 12 is a diagram illustrating a slice image.

In the example shown in FIG. 3, the first and second projection areas 11 and 12 are aligned and partially overlapped with each other in the X-direction. In contrast, as shown in FIG. 11, the first and second projection areas 11 and 12 may be aligned and partially overlapped with each other, with their two edges aligned with each other in the Y-direction. In this case, as shown in FIG. 12, in the slice image 60, the first and second areas 61 and 62 are arranged and partially overlapped with each other in the overlapped area 63, with their two edges aligned with each other in the Y-direction. In this case, "X-direction" and "Y-direction" in the description made with reference to FIGS. 6 to 10 should read "Y-direction" and "X-direction," respectively.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A control device for controlling a modeling machine that elevates, with an elevating mechanism, a holder in a photosensitive resin in a resin vat while projecting pictures on a bottom of the resin vat with first and second projectors, the bottom being transparent to light, wherein the control device is configured or programmed to execute a process comprising:
   a reading step including reading a slice image;
   a positioning step including positioning a boundary line in a first direction perpendicular or substantially perpendicular to a second direction in an overlapped area where first and second areas in the slice image overlap with each other, the first and second areas being aligned and partially overlapped with each other in the second direction;
   an extraction step including extracting a first image segment in the first area from the slice image and a second image segment in the second area from the slice image;
   a luminance zeroization step including dropping luminance values in the boundary line in the first image segment to zero, dropping luminance values in an area at the side of the second area relative to the boundary line in the first image segment to zero, dropping luminance values in the boundary line in the second image segment to zero, and dropping luminance values in an area at the side of the first area relative to the boundary line in the second image segment to zero; and
   an output step including generating first and second picture signals according to the first and second image segments, respectively, that have been subjected to the luminance zeroization step and outputting the first and second picture signals to the first and second projectors, respectively; wherein
   the control device repeats the process with shifting, in the second direction, the boundary line every time that the control device executes the positioning step.

2. A control device for controlling a modeling machine that elevates, with an elevating mechanism, a holder in a photosensitive resin in a resin vat while projecting pictures on a bottom of the resin vat with first and second projectors, the bottom being transparent to light, wherein the control device is configured or programmed to execute a process comprising:
   a reading step including reading a slice image;
   a positioning step including positioning a boundary line in a second direction perpendicular or substantially perpendicular to a first direction in an overlapped area where first and second areas in the slice image overlap with each other, the first and second areas being aligned and partially overlapped with each other in the first direction;
   a luminance zeroization step including dropping luminance values in the boundary line in the first image segment to zero, dropping luminance values in an area at the side of the second area relative to the boundary line in the first image segment to zero, dropping luminance values in the boundary line in the second image segment to zero, and dropping luminance values in an area at the side of the first area relative to the boundary line in the second image segment to zero; and
   an output step including generating first and second picture signals according to the first and second image segments, respectively, that have been subjected to the luminance zeroization step and outputting the first and second picture signals to the first and second projectors, respectively; wherein
   the control device repeats the process with shifting, in the first direction, the boundary line every time that the control device executes the positioning step.

3. A control device for controlling a modeling machine that elevates, with an elevating mechanism, a holder in a photosensitive resin in a resin vat while projecting pictures on a bottom of the resin vat with first and second projectors, the bottom being transparent to light, wherein the control device is configured or programmed to execute a process comprising:
   a reading step including reading a slice image and copying the slice image;
   a positioning step including positioning a boundary line in a first direction perpendicular or substantially perpendicular to a second direction in each of overlapped areas where first and second areas in the respective slice images overlap with each other, the first and second areas being aligned and partially overlapped with each other in the second direction;
   a luminance zeroization step including dropping luminance values in the boundary line in one slice image to zero, dropping luminance values in an area at the side of the second area relative to the boundary line in the one slice image to zero, dropping luminance values in the boundary line in the other slice image to zero, and dropping luminance values in an area at the side of the first area relative to the boundary line in the other slice image segment to zero;
   an extraction step including extracting a first image segment in the first area from the one slice image and a second image segment in the second area from the other slice image; and
   an output step including generating first and second picture signals according to the first and second image segments, respectively, and outputting the first and second picture signals to the first and second projectors, respectively; wherein
   the control device repeats the process with shifting, in the second direction, the boundary line every time that the control device executes the positioning step.

4. A control device for controlling a modeling machine that elevates, with an elevating mechanism, a holder in a photosensitive resin in a resin vat while projecting pictures on a bottom of the resin vat with first and second projectors, the bottom being transparent to light, wherein the control device is configured or programmed to execute a process comprising:
   a reading step including reading a slice image and copying the slice image;
   a positioning step including positioning a boundary line in a second direction perpendicular or substantially perpendicular to a first direction in each of overlapped areas where first and second areas in the respective slice images overlap with each other, the first and second areas being aligned and partially overlapped with each other in the first direction;
   a luminance zeroization step including dropping luminance values in the boundary line in one slice image to zero, dropping luminance values in an area at the side of the second area relative to the boundary line in the one slice image to zero, dropping luminance values in the boundary line in the other slice image to zero, and dropping luminance values in an area at the side of the first area relative to the boundary line in the other slice image segment to zero;

an extraction step including extracting a first image segment in the first area from the one slice image and a second image segment in the second area from the other slice image; and an output step including generating first and second picture signals according to the first and second image segments, respectively, and outputting the first and second picture signals to the first and second projectors, respectively; wherein the control device repeats the process with shifting, in the first direction, the boundary line every time that the control device executes the positioning step.

* * * * *